United States Patent [19]

Veltrup et al.

[11] 4,042,178

[45] Aug. 16, 1977

[54] SHUTOFF VALVE CONSTRUCTION PARTICULARLY FOR HIGH PRESSURE

[75] Inventors: Elmar Michael Veltrup, Krefeld-Fischeln; Wolfgang Maasberg, Krudenberg, Post Drevenack, both of Germany

[73] Assignee: Woma-Apparatebau Wolfgang Maasberg & Co. GmbH, Germany

[21] Appl. No.: 651,252

[22] Filed: Jan. 22, 1976

[30] Foreign Application Priority Data

Jan. 25, 1975 Germany ............................ 2503121

[51] Int. Cl.[2] ............................................ F16K 31/143

[52] U.S. Cl. ................................................... 251/44

[58] Field of Search .................... 239/412; 251/25, 26, 251/44, 45, 46

[56] References Cited

U.S. PATENT DOCUMENTS

| | | | |
|---|---|---|---|
| 1,307,207 | 6/1919 | Mitchell | 251/44 |
| 2,648,349 | 8/1953 | McGarry | 251/25 |
| 2,698,729 | 1/1955 | Cox et al. | 251/25 |
| 2,805,037 | 9/1957 | Bruce | 251/25 |
| 2,841,359 | 7/1958 | Berck | 251/25 |
| 3,170,487 | 2/1965 | Julifs et al. | 251/25 |
| 3,399,689 | 9/1968 | Keane | 251/25 |
| 3,896,840 | 7/1975 | Andersson | 251/25 |

*Primary Examiner*—Martin P. Schwadron
*Assistant Examiner*—G. L. Walton
*Attorney, Agent, or Firm*—McGlew and Tuttle

[57] ABSTRACT

A shutoff valve for high and maximum pressures comprises a housing with an inlet passage communicating with a discharge passage and having a valve seat therebetween which is closable by a differential piston having one face which is seatable on the valve and an opposite face in a first control chamber. The first control chamber is connectable through a first control valve to a bypass which extends to the discharge passage. In addition a second control chamber is located in the bypass passage and it is regulated by a separate second control valve. A separate control member such as a pivotal lever is associated with each control valve and each must be separately operable in order to permit movement of the differential piston off the valve seat to open the flow passage.

4 Claims, 2 Drawing Figures

SHUTOFF VALVE CONSTRUCTION PARTICULARLY FOR HIGH PRESSURE

BACKGROUND OF THE INVENTION

1. Field of the Invention

This invention relates in general to the construction of valves and in particular to a new and useful valve for high and maximum pressures and two separately operable control levers for effecting the opening thereof.

2. Description of the Prior Art

Shutoff valves which are particularly useful for high pressure devices such as spray guns are known in various forms and particularly those which consist of a differential piston which is driven by a pressure medium in the form of a liquid or gas to be shut off and which works in a cylinder of the valve housing between the inlet and the outlet passages for the pressure medium. Such a valve operates against a seal associated with the outlet passage and it is controlled by a control piston which is arranged on the inlet side or downstream side ahead of the differential position in a common pressure chamber therewith. A throttling zone leads from the inlet range of the differential piston into the pressure chamber formed between the outer wall of the piston and the cylinder. In a known embodiment a differential piston has an axial through-bore with a valve seat arranged on the side opposite the seal for the differential piston and which is provided for the control piston and which is adjustable by means of a control mechanism. If the control piston is in a closing position, it is pressed against the valve seat by the differential piston for closing the axial through-bore. To this end the control mechanism has a piston rod connected to the control piston which is surrounded by a compression spring which admits the control piston. Consequently the closing force in such a construction results from the spring force of the respective compression spring which is employed. This in turn leads to a relatively great opening and holding force which must be expended by the operator of any device employing it such as a spray gun.

The present invention as already suggested in another application which has not become part of the state of the art that the differential piston be separated from the control piston by a pressure chamber and that the control piston is like the differential piston in a closing position due to the pressurization by the pressure medium from the outside of the pressure chamber and exposes a bypass arranged in the valve housing and opening into the outlet behind the seal in the direction of flow after it has been forced back into the opening position by means of a control mechanism. Both the embodiments have the disadvantage that the control mechanism does not provide an adequate safety since the installation of such a shutoff valve in a high pressure spray gun perm its actuation of the gun with only one hand. The other hand remains free and this is not without risk considering the fact that the high pressure spray guns work with very high and maximum pressures and can result in injuries to the operator.

SUMMARY OF THE INVENTION

The invention provides a shut-off valve for high and maximum pressure operation particularly for the operation of high pressure spray guns which is doubly secured and which can be operated only with both hands. In accordance with a feature of the invention a differential piston is arranged in a first control chamber and it has one end which is seatable on a valve seat located between the inlet passage and a discharge passage for the flow medium. The opposite end of the differential piston is in the first control chamber which communicates through a bypass to the discharge passage through a first control valve means. The first control valve means includes a first control piston which is movable to permit communication between the first control space and the bypass passage when it is actuated by a pivotal first lever member. A second control chamber is located in the bypass passage and it includes a second control valve which is separately operable by a second pivotal control lever. Thus only after both first and second control valves are released can the differential piston open. The arrangement is such that both the first and second control valves must be operated simultaneously in order to have the shut-off valve move to open and permit flow from the inlet passage to the outlet passage. In addition the shut-off valve will close immediately when it is operated only with one hand. This prevents the risk of accidents. This is particularly true when the valve is incorporated on a high pressure spray gun.

In a preferred arrangement of the invention the first safety valve is provided with a valve body which is arranged in the first control chamber and it includes one or more flow channels for communicating this control chamber with the bypass passage which connects to the discharge passage of the valve. The control lever is pivotally mounted on the housing so that is may directly contact the piston rod portion of the first control valve to move the piston to open the communicating passages through the bypass passage. The valve piston rod can be designed as a separate element in both the first control chamber and in the second control chamber and the actuating lever mechanisms for operating these control valves are advantageously located so that they are each out of the range of the other.

Accordingly it is an object of the invention to provide an improved control valve which includes a differential valve which is movable off and on a main valve seat between an inlet and an outlet passage and which has an opposite face disposed in a first control chamber having first control valve means which are separately operable for opening the passage of the control chamber to a bypass connected to the discharge of the valve and which also includes a second control valve means and a second control chamber located in the bypass line and wherein the valves are separately operable to open the differential valve and to permit its closure in the event only one is operated.

A further object of the invention is to provide a valve which is particularly usable in spray guns and which includes two separately operable control elements which are manually movable and which must be simultaneously operated by the respective hands of the operator in order to effect spraying.

A further object of the invention is to provide a shutoff valve which is simple in design, rugged in construction and economical to manufacture.

For an understanding of the principles of the invention, reference is made to the following description of a typical embodiment thereof as illustrated in the accompanying drawings.

GENERAL DESCRIPTION OF THE PREFERRED EMBODIMENT

Figure 1:
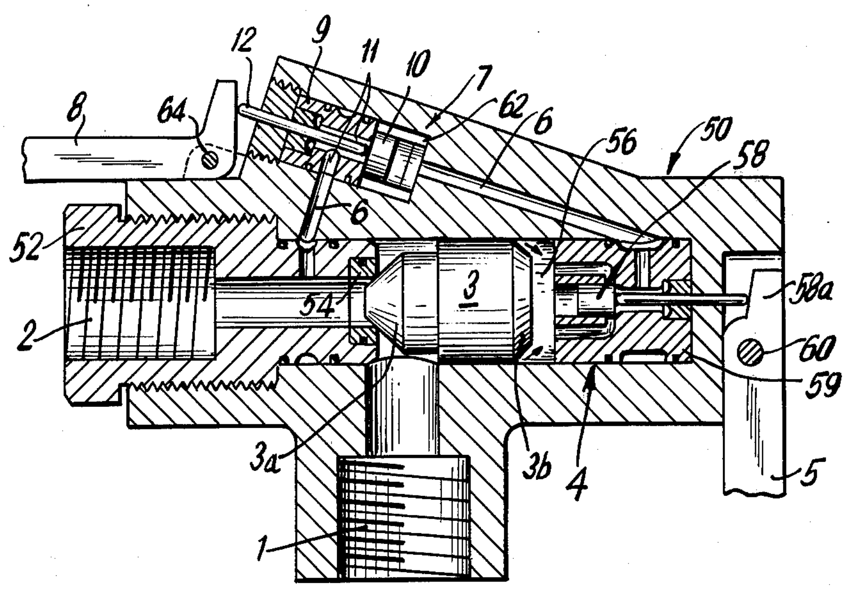
FIG. 1 is an axial sectional view of a shut-off valve constructed in accordance with the invention.
Figure 2:
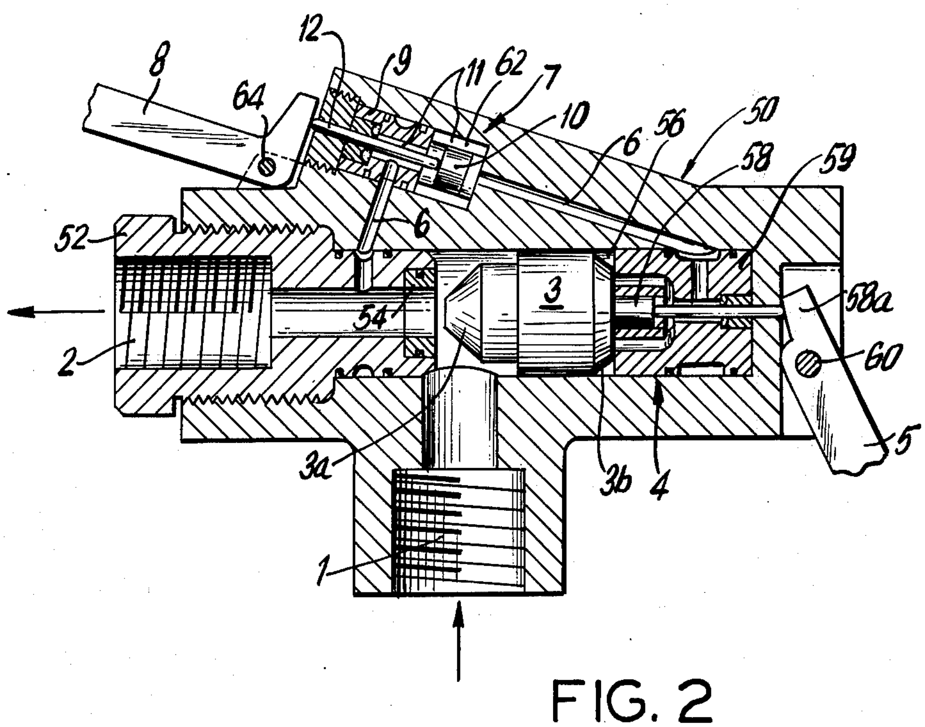
FIG. 2 is a view similar to FIG. 1 showing the valve in an open position.

Referring to the drawings in particular the invention embodied therein comprises a shut-off valve which is particularly usable for high and maximum pressures and particularly for use in a high pressure spray gun.

In accordance with the invention the spray valve includes a housing generally designated 50 having an inlet passage 1 for the inflow of medium and an outlet passage 2 for the outflow. An outlet fitting 52 is provided with a valve seat 54 which is engageable by one end *3a* of a differential piston 3 which has an opposite end *3b* arranged in a first control chamber 56 which is communicatable under control of the first control piston valve 4 to a bypass passage 6 which has an opposite end terminating in the discharge passage 2.

In accordance with the invention the first control means comprises a first control piston 58 which is mounted for movement in a first control cylinder 59 under the control of a pivotal control rod 5 which is pivoted at 60 on the housing 50 and which acts against a piston rod portion 58*a*.

In accordance with a feature of the invention a second control chamber 62 is located in the bypass 6 and it includes a second control valve means or safety valve 7 comprising a valve body 9 having flow conduits 11 which are closable by a valve piston 10. The valve piston 10 has a valve rod 12 which is displaceable under the control of a control rod 8 which is pivoted at 64 in the housing 50. When the control mechanism 8 is operated the valve rod 12 is depressed with the valve piston 10 to open the passages 11 and permit flow through the bypass 6.

A feature of the construction is that the control rod 8 is located outside of the operating range of the control rod 5 so that they must be operated with separate hands. The control valve 4 can be of the same size as the safety valve 7 and the individual valve pistons 10 and 58 may be of the same size. Instead of a piston the valves 10 and 58 may comprise a valve ball.

While a specific embodiment of the invention has been shown and described in detail to illustrate the application of the principles of the invention, it will be understood that the invention may be embodied otherwise without departing from such principles.

The embodiments of the invention in which an exclusive property or privilege is claimed are defined as follows:

1. A shutoff valve or high pressures, particularly for high pressure spray guns, comprising a housing having an inlet passage, a discharge passage communicating with said inlet passage for the flow of fluid through said inlet passage and out said discharge passage, a valve seat defined between said inlet passage and said discharge passage, a differential piston movable in said housing between a closed position on said valve seat and closing said valve to close off the flow of fluid and to an open position spaced from said valve seat to open said valve, means defining a first control chamber on the side of said differential position opposite to said valve seat, a by-pass extending from said control chamber to said discharge passage having a second control chamber therein, first control valve means in said first control chamber including a first control member separately movable to an opened position to open said first control valve means and to communicate said first control chamber with said by-pass passage, second control valve means in said second control chamber including a second control member spaced apart from and movable separately from said first control member to an open position to open the said bypass passage and permit flow of fluid therethrough, said piston valve being movable to an open position only when both said first and second control members are moved to an open position.

2. A shut-off valve according to claim 1, wherein said second control valve means includes a second movable member in said control chamber, being movable to open and close the by-pass passage, and a second control member mounted on said housing for movement against said second movable member to move said second movable member for opening communication in said by-pass passage.

3. A shutoff valve according to claim 1, including first and second pivotal control members mounted on said housing at spaced apart locations, said first control valve means including a movable valve member engageable by said first control member for movement thereby, said second control valve means including a second valve member engageable by said second control member and movable thereby for opening the communication between said first control passage and said discharge passage only when said first and second control members are actuated.

4. A shutoff valve according to claim 1, wherein said first control valve means includes a cylinder in said first control chamber having a passage defined between said control chamber and said bypass passage, a first piston movable in said first cylinder for opening and closing the passages therein and having a first piston rod portion connected thereto, a first lever member pivotally mounted on said housing adjacent said first piston rod portion in a position to actuate said piston rod portion for moving said piston to open the passages in said first cylinder, said second valve control means comprising a second cylinder, a piston having a rod portion movable in said second cylinder, said second cylinder having a passage communicating at respective ends with said bypass passage which is closable by said second piston, said second piston having a second rod portion, and a second control member pivoted on said housing at a location spaced from said first control member and engageable with said second piston rod portion for displacing said second piston to open the communicating passages in said bypass line.

* * * * *